START PULSE RECEIVING CIRCUIT

Filed Jan. 23, 1967

INVENTOR.
WILLIAM J. MELVIN
BY Moody and Phillion
ATTORNEYS

United States Patent Office 3,538,252
Patented Nov. 3, 1970

3,538,252

START PULSE RECEIVING CIRCUIT

William J. Melvin, Costa Mesa, Calif., assignor to Collins Radio Company, Cedar Rapids, Iowa, a corporation of Iowa Filed Jan. 23, 1967, Ser. No. 610,894
Int. Cl. H04l *15/00;* H04b *1/00, 1/10*
U.S. Cl. 178—68 4 Claims

ABSTRACT OF THE DISCLOSURE

The start pulse code comprises a train of N pulses time spaced apart so that no single time spacing or combination of adjacent time spacing is equal to any other single time spacing or combination of adjacent time spacings. Receiving said pulse train is a delay line having N taps spaced therealong at time delayed intervals which taps coincide with the pulses of said start pulse train at one, and only one, point in time as said pulse train propogates therethrough. A voltage adder adds the outputs on said taps at said one point in time to produce a single, large start pulse.

This invention relates generally to a start pulse receiving circuit for energizing a receiver in a communication system and, more particularly, to a receiver start pulse circuit which, in effect, increases the apparent output of the transmitter of the system.

In many communication systems involving a transmitter and a receiver it is often necessary to warn the receiving station that intelligence is about to be transmitted. This warning requires some kind of an initiating or a start pulse supplied to and detected by the receiver. With any given equipment the power output of the transmitter is fixed, whereas the noise is variable, depending to a large extent upon the condition of the transmission media, which can be either atmosphere or a transmission line. The principal problem involved is that the receiver must be able to distinguish a start pulse from the noise. An obivous way for the receiver to so distinguish is for the energy content of the start pulse to be well above that of probable noise, within predetermined tolerances. The power output of the transmitter, however, is limited and a start pulse of the desired magnitude is often not available.

One prior art method for generating and receiving a start pulse, in effect, amplifies the output of the transmitter. Such prior art system is employed in bit synchronous systems, wherein each bit is contained in a time interval equal to the time interval of all other bits, said time intervals occurring sequentially and consecutively. The start pulse code consists of a train of N bits consisting of binary "1's" or "0's" and occurring in a predetermined sequence. At the receiver the train of pulses are fed into a shift register which has N stages. The shift register is constructed so that each stage will produce a positive or negative voltage output in accordance with whether a "1" or a "0" is contained in that stage. With the use of inverters on selected outputs of the shift register all the outputs of the shift register can be made to be of the same polarity, for example a positive polarity, when a starting pulse code is in the keyed position in the shift register.

By "keyed position" is meant that the first bit of the starting pulse code is in the first stage of the shift register, the second bit of the starting pulse code is in the second stage of the shift register, and the Nth pulse is in the Nth stage. An adder can be employed to add together the voltages appearing at the outputs of each of the stages of the shift register to produce a total voltage equal to N times the voltage appearing at the output of each individual stage. This one large voltage is sufficient to warn the receiver that information is to follow.

While the foregoing prior art structure has proven satisfactory in many applications, for other applications erroneous starting signals occur too often. The primary reasons for such erroneous detection are as follows. Since the pulses of the starting code are time synchronous with the data that follows, it is possible for data to occasionally simulate the start code and there accidentally trigger the receiver into operation. A second source of error lies in the perturbation of the starting code itself. Under normal operations the start pulse code will not produce an output greater than the output of a single stage of the shift register until it is in the keyed position. More specifically, in any position other than the keyed position a start code having a pattern of "1's" and "0's" can be arranged so that cancellation of the output voltages of the shift register will occur. As a specific example, assume that a seven-stage shift register is used. Now, in all positions, other than the keyed position, the start pulse code can have a pattern of "1's" and "0's" so that three of the stages of the shift register will have a negative output and four will have a positive output or, alternately, four of the stages of the shift register will have a negative output and three will have a positive output. However, if one of the bits of the starting pulse code should be reversed because of noise, the error is doubled. For example, if in a given position of the start code in the shift register there are four positive outputs and three negative outputs and one of the negative outputs is changed to a positive output, the result is five positive outputs and two negative outputs, or a resultant voltage equal to three positive outputs. Similarly, if two bits in the start pulse code are reversed due to noise, the resultant output signal could be equal to five times the voltage of a single stage, which could be sufficient to trigger the receiver.

An object of the present invention is a receiver start pulse circuit which cannot be triggered by data.

A second purpose of the invention is a receiver start pulse circuit in which a change of polarity of a pulse in the start pulse code will result in only a single error in the number of effective bits remaining in the start pulse code.

A third purpose of the invention is a relatively simple and reliable start pulse circuit.

A fourth aim of the invention is a simple and reliable receiver start pulse circuit employing a train of pulses in which the time interval between any two pulses therein is different from the time spacing between any other two pulses in said train of pulses.

A fifth object of the invention is the improvement of receiver start pulse circuits, generally.

In the invention there is provided, in a communication system, a receiver start pulse circuit comprising means at the transmitter for generating a start pulse code consisting of a train of pulses which are time spaced apart by different time intervals in such a manner that the time interval between any two pulses is not equal the time interval between any other two pulses.

A delay line means having a plurality of output taps spaced along the length thereof is provided at the receiver so that at one point in time, and only one point in time, as the start pulse code is traveling along the delay line, each pulse of said start pulse code will coincide with an output tap of said delay line. Voltage adding means are provided to add together the output voltage on all the output taps of the delay line to produce a single large start pulse which functions to signal the receiver that information is to follow.

In accordance with a feature of the invention, coincidence between each pulse of the start pulse code and a tap of the delay line can occur at only one point in time as the start pulse code is traveling through said delay line. This single point in time is identified herein as the keyed position of the start pulse code.

The above-mentioned and other objects and features of the invention will be more fully understood from the following detailed description thereof when read in conjunction with the drawings in which.

Figures 1, 5:
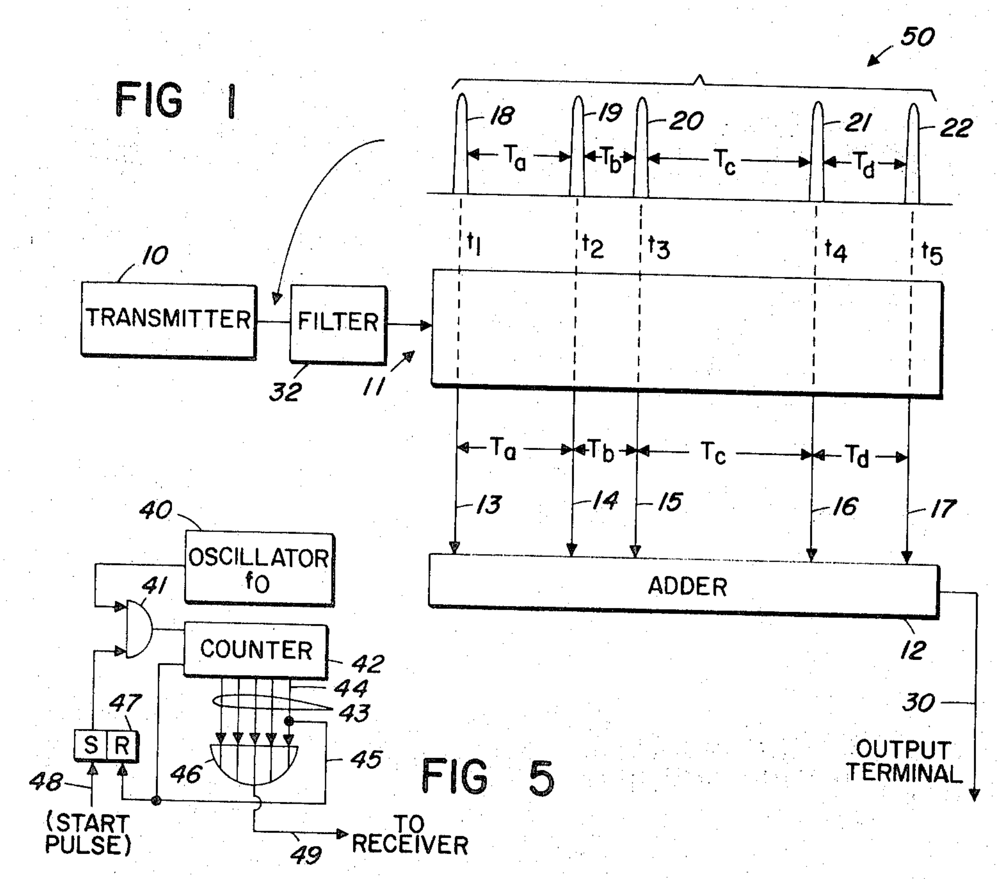
FIG. 1 is a block diagram showing the relationship between the individual pulses of the start pulse code and the output taps of the delay line.
FIG. 5 is a logic diagram of a means for generating the starting pulse code at the transmitter.
Figure 4:
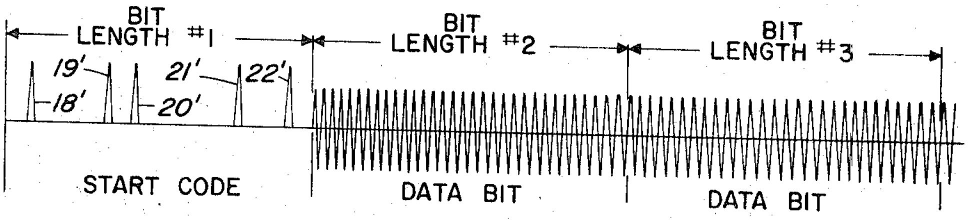
FIG. 4 shows the relation between the start code pulses and the bit length of the synchronous data.

Referring now to FIG. 1, the transmitter 10 functions to generate and transmit to the receiver a train of pulses consisting of pulses 18, 19, 20, 21, and 22 and spaced apart by time intervals $t_a$, $t_b$, $t_c$, and $t_d$. The said start code pulses are also shown in FIG. 4 and can be seen to be included within one bit frame. Following the start code are data bits in bit frame #2 and bit frame #3 in FIG. 4.

While only five pulses have been shown as constituting the start code pulse in FIG. 1, it is to be understood that the start code can consist of any number of pulses.

The time spacing between the pulses is an important feature of the invention. More specifically, any of the time intervals $t_a$, $t_b$, $t_c$, or $t_d$ or combinations of adjacent ones of said time intervals must not be equal to any other of the time intervals or combinations of adjacent ones of said time intervals. The foregoing will be seen more clearly from the following discussion of the operation of delay line 11.

At the receiver the start pulse code 50 is supplied to delay line 11 which has a plurality of taps 13, 14, 15, 16, and 17 positioned therealong. The spacing between these taps, as measured in terms of time delay, are respectively $T_a$, $T_b$, $T_c$, and $T_d$. Such time delays are equal to the time delays $t_a$, $t_b$, $t_c$, and $t_d$ between pulses 18, 19, 20, 21, and 22, respectively, of the received start pulse 50.

As the start code is supplied to delay line 11, the first received pulse 22 will propagate past tap 13, then past tap 14, then tap 15, followed by tap 16 and finally tap 17, generating a pulse at each tap. Subsenquently, pulse 21 will propagate past taps 13 through 17, generating a pulse at each tap. Then pulses 20, 19, and 18 will pass the taps generating a pulse at each tap.

However, each of the pulses generated on taps 13, 14, 15, 16 and 17 by the pulses 18 through 22 will occur at points in time when no other pulse is being generated, except at the one point in time where all five pulses of the starting code are in said keyed position along the delay line, as shown in FIG. 1; i.e., when the time interval spacing between the input pulses coincides with the time interval spacing of output taps 13 through 17. Thus when pulses 18, 19, 20, 21, and 22 are passing taps 13, 14, 15, 16, and 17, respectively, each of said five pulses will simultaneously create an output pulse on one of said five taps. The adder 12 functions to add these pulses together to produce on output terminal 30, a single resultant pulse of a magnitude approximately five times the magnitude of each of the pulses appearing on any of the output taps 13 through 17.

It is to be noted specifically that due to the selected time spacing between pulses 18 through 22, only one of such pulses at any given point in time can produce an output pulse on one of the output taps 13 through 17, except in the keyed position described above. Thus the chances for false signaling of the receiver is minimized.

Since the pulses of the starting code signal are not synchronous with the data, as shown in FIG. 4, the said data signals will not function to produce output signals on the output taps of delay line 11. More specifically, the frequency of the carrier signal of the data bits can be made sufficiently large so that it is blocked from entering the delay line and causing any spurious start signals to occur. Such blocking can be accomplished by a simple filter means 32 interposed at the receiver site before the delay line. The start code pulses contain much more energy than any single cycle of the data bit and, further, have much lower fundamental frequency so that they are admitted to delay line 11 to perform the starting function.

If noise perturbations should cancel one of the start pulses, there would still remain four start pulses which would produce a resultant single output pulse terminal 30 of a magnitude four time that of a pulse at any one of the taps 13 through 17. Such an output pulse would function to energize the receiver for reception of data. It is to be specifically noted that if one of the start pulses 18 to 22 were canceled by noise, that the error would be a single error, i.e., the loss of one start pulse would not produce a change in the resultant single output voltage equal to twice the contribution of a single pulse of the start code train of pulses, as was discussed in the introductory portion of this specification with respect to certain prior art devices.

Figure 2:
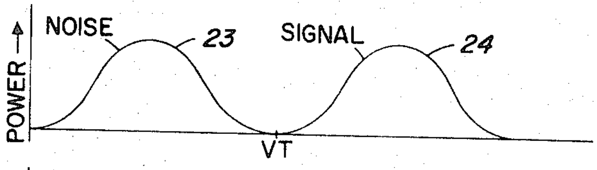
FIGS. 2 and 3 are probability curves illustrating the desired differences of magnitude between signal levels and noise levels in order to insure that false triggering above a certain minimum tolerance will not occur.
Figure 3:
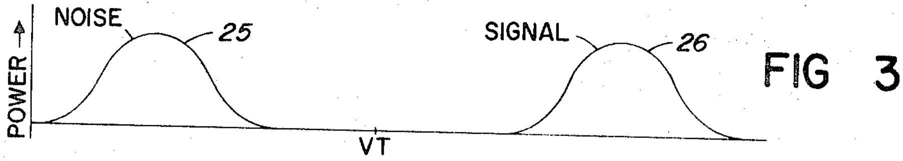

Referring now to FIGS. 2 and 3, there are shown distribution of energy curves illustrating how the present invention markedly improves the reliability of operation of the start pulse circuit and minimizes erroneous starts. FIG. 2 shows the relative levels of noise and signals which might exist in the absence of means for effectively amplifying the transmitter output and FIG. 3 shows the relative levels of noise and signal where the transmitter output is effectively amplified. In both FIGS. 2 and 3 is shown a noise distribution curve and the start pulse signal distribution curve, with the vertical axis representing probability density and the horizontal axis representing signal or noise amplitude. The voltage $V_T$ represents a threshold voltage above which the receiver will be activated and below which it will not be activated. In FIG. 2 it can be seen that there is definite probability of noise signals 23 occasionally exceeding the threshold voltage $V_T$ and thereby energizing the receiver. It can also be seen in FIG. 2 that there will be occasions when a start pulse will lie below the threshold voltage $V_T$ and will be insufficient to energize the receiver.

In the present invention the level of the starting pulse voltage supplied to the receiver at output terminal 30 of FIG. 1 from a start pulse code is substantially increased to create a much wider separation between the probable noise level distribution 25 and the probable start pulse signal level distribution 26, as shown in FIG. 3. The threshold voltage $V_T$ is set well above the probable noise level and well below the probable lowest output signal appearing on output terminal 30 of FIG. 1, thus minimizing the chance of an erroneous start pulse due to noise and maximizing the probability of an authenic start signal energizing the receiver.

In FIG. 5 there is shown a means for generating the start code pulse at the transmitter. Oscillator 40 produces a constant output signal of frequency $f_0$, which is considerably higher than the frame frequency of the system. For example, $f_0$ could be 100 times the frame repetition rate. The output of oscillator 40 is supplied to one input of AND gate 41. The other input of AND gate 41 is supplied from the set side of flip-flop 47. When transmission is to be initiated, a start pulse is supplied at the transmitter to input lead 48 of flip-flop 47, thereby setting flip-flop 47 and opening AND gate 41.

The output of oscillator 40 then passes through AND gate 41 and into counter 42, which has a plurality of output taps 43, to each of which is supplied one of the pulses 18 through 22 of the start pulse code 50 of FIG. 1. Individual ones of the start pulses occur sequentially on output taps 43 with the proper time spacing and pass through OR gate 46 to common output lead 49 as the start pulse code 50 of FIG. 1. The last pulse of the start pulse code, which is pulse 22 of FIG. 1, appears on output lead 44 of FIG. 5 and functions to reset flip-flop 47 through lead 45, thereby cutting off AND gate 41 and blocking the output of oscillator 40 from the counter 42. Pulse 22, appearing on lead 45, also functions to reset counter 42 to zero.

It is to be understood that the form of the invention shown and described herein is a preferred embodiment thereof and that various changes may be made therein without departing from the spirit and scope of the invention.

I claim:

1. In a communication system comprising transmitter means and receiver means;

start signal generating means at said transmitter means for generating a start signal comprising a series of N pulses serially transmitted with any two of said pulses being spaced apart a time interval which is unequal to and not a multiple of the time spacing between any other two pulses of said N pulses;

detecting means for detecting said start signal located at said receiver means and comprising delay line means having a series of N output taps thereon spaced apart successively by delay time intervals which are equal, respectively, to the time intervals between successive pulses of said start signal;

and adding means for adding together the output signals appearing at said taps.

2. In a communication system comprising transmitter means and receiver means;

start signal generating means at said transmitter means for generating a start signal comprising a series of N pulses serially transmitted with the time spacing between any two of said pulses being unequal to and not a multiple of the time spacing between any other two pulses of said N pulses;

detecting means for detecting said start signal located at said receiver means and comprising delay line means having a series of N taps thereon spaced apart successively by delay time intervals which are equal, respectively, to the time intervals between successive pulses of said start signal; and means responsive to the coincidence of output signals at said taps.

3. A receiver means for receiving a start signal comprised of N pulses serially received, with any two of said pulses being spaced apart a time interval which is unequal to and not a multiple of the time spacing of any other two pulses of said N pulses further, the time interval spacing of any two pulses is unequal to and not a multiple of any combination of adjacent time spacings of any other three of said N pulses, and comprising;

detecting means for detecting said start signal and comprising delay line means having a series of N output taps thereon spaced apart successively by delay time intervals which are equal, respectively, to the time intervals between successive pulses of said start signal; and adding means for adding together the output signals appearing at said output taps.

4. A receiver means for receiving a start signal comprised of N pulses serially received, with any two of said pulses being spaced apart a time interval which is unequal to and not a multiple of the time spacing of any other two pulses of said N pulses, and comprising;

detecting means for detecting said start signal and comprising delay line means having a series of N taps thereon spaced apart successively by delay time intervals which are equal, respectively, to the time intervals between successive pulses of said start signal; and means responsive to the coincidence of output signals at said taps.

References Cited

UNITED STATES PATENTS

| | | | |
|---|---|---|---|
| 2,719,188 | 9/1955 | Pierce. | |
| 2,926,217 | 2/1960 | Powell. | |
| 2,976,516 | 3/1961 | Taber. | |
| 3,105,197 | 9/1963 | Aiken. | |
| 3,267,567 | 8/1966 | Gerardin et al. | 343—17.2 XR |
| 3,371,343 | 2/1968 | Sones | 343—17.2 |

ROBERT L. GRIFFIN, Primary Examiner

ALBERT J. MAYER, Assistant Examiner

U.S. Cl. X.R.

325—38, 65, 323; 333—70; 340—167

UNITED STATES PATENT OFFICE
CERTIFICATE OF CORRECTION

Patent No. 3,538,252 November 3, 19'

William J. Melvin

It is certified that error appears in the above identified patent and that said Letters Patent are hereby corrected as shown below:

Column 1, line 20, "propogates" should read -- propagates line 42, "obivous" should read -- obvious --. Column 3, line 1! "starting" should read -- start --; line 45, after "code" inse: -- pulse --; line 48, "subsenquently" should read -- subsequently --. Column 4, line 15, "resutlant" should read -- resultant --; line 58, "authenic" should read -- authentic Signed and sealed this 6th day of April 1971.

(SEAL)
Attest:

EDWARD M.FLETCHER,JR.
Attesting Officer

WILLIAM E. SCHUYLER, .
Commissioner of Paten'